United States Patent [19]

Hashimoto et al.

[11] Patent Number: 4,849,827
[45] Date of Patent: Jul. 18, 1989

[54] DISK AND NAVIGATION APPARATUS FOR POSITION LOCATING SYSTEM

[75] Inventors: Komei Hashimoto; Tetsuo Harayama, both of Saitama, Japan

[73] Assignee: Pioneer Electronic Corporation, Tokyo, Japan

[21] Appl. No.: 171,724

[22] Filed: Mar. 22, 1988

[30] Foreign Application Priority Data

Mar. 27, 1987 [JP] Japan ................... 62-75440

[51] Int. Cl.$^4$ ............................... G11B 7/00
[52] U.S. Cl. ..................... 358/342; 340/990; 340/995; 364/443; 364/449
[58] Field of Search ............. 358/335, 342; 340/988, 340/990, 995; 364/443, 449, 460

[56] References Cited

U.S. PATENT DOCUMENTS

| | | | |
|---|---|---|---|
| 4,484,192 | 11/1984 | Seitz et al. | 364/460 X |
| 4,607,290 | 8/1986 | Murakami | 358/260 |
| 4,660,037 | 4/1987 | Nakamura | 364/443 X |
| 4,716,404 | 12/1987 | Tabata et al. | 340/995 X |

FOREIGN PATENT DOCUMENTS

| | | |
|---|---|---|
| 3033279 | 11/1982 | Fed. Rep. of Germany . |
| 3213630 | 11/1982 | Fed. Rep. of Germany . |
| 3427879 | 1/1986 | Fed. Rep. of Germany . |
| 3447759 | 2/1986 | Fed. Rep. of Germany . |
| 3609288 | 10/1986 | Fed. Rep. of Germany . |
| 3708276 | 10/1987 | Fed. Rep. of Germany . |

OTHER PUBLICATIONS

An Optical Video Disk System for Retrieving Digital Data & Reproducing Still Picture w/Sound, IEEE Transactions on Consumer Electronics, vol. CE-30, No. 3, Aug. 1984.

*Primary Examiner*—Robert L. Richardson
*Attorney, Agent, or Firm*—Sughrue, Mion, Zinn, Macpeak & Seas

[57] ABSTRACT

A disk and navigation apparatus for reproducing the disk in a position locating system wherein the maps are more clearly displayed without requiring a large increase in the amount of data storage capacity required. On the disk there are recorded in a frequency division multiplex mode a video FM signal of a first frequency band obtained by frequency-modulating a video signal containing map data, and a video digital signal of a second frequency band obtained by digitizing and digitally modulating a video signal indicative of a travel path of the map data along which the object to be guided moves. The video digital signal of the travel path in a picture is located on the same track as the video FM signals of N (integer) fields of the corresponding picture.

3 Claims, 4 Drawing Sheets

DISK AND NAVIGATION APPARATUS FOR POSITION LOCATING SYSTEM

BACKGROUND OF THE INVENTION

The present invention relates to a disk on which map data for guiding an object such as a motor vehicle to its destination are recorded, and to a navigation apparatus using such a disk.

FIG. 1 is a block diagram of a conventional navigation apparatus. In FIG. 1, reference numerals 1, 2 and 3 designate detecting devices which include, for instance, an earth magnetism sensor, a vehicle speed sensor and a gyro sensor. The earth magnetism senses earth's magnetic field to detect the absolute direction of the vehicle, the vehicle speed sensor detects the speed of a vehicle from the speed of rotation of the wheels or the like. The gyro sensor detects the relative turning direction of a vehicle. For example, when the yaw rate is high or the tires slip, the gyro sensor is not always reliable. In such cases, the output of the earth magnetism sensor takes precedence over that of the gyro sensor.

The outputs of the detecting circuits 1, 2 and 3 are applied to an A/D (analog-to-digital) converter circuit 4, where they are converted into digital signals. The digital signals are supplied to a processor 5. The processor 5 operates upon the input data, which is two-dimensional coordinates, to detect and determine the present position of the vehicle.

In FIG. 1 reference numeral 6 designates an operating unit composed of a keyboard and switches. The operating unit 6 is operated to input predetermined instructions or commands. When the operating unit 6 applies an input signal to a control circuit 8 (inclusive of a microcomputer), the control circuit 8 causes the relevant circuits and units to operate according to the input signal, and, when necessary, activates a display unit 7 implemented with lamps and LEDs (light-emitting diodes), for example.

Upon reception of a navigation operation start instruction, the control circuit 8 causes a reproducing device, namely, a player 9, to play back a disk (CD-ROM or the like). Map data have been recorded in a digital mode on the disk. The control circuit 8 causes the player 9 to search and reproduce a map including the present position inputted by the processor 5. The player 9 outputs digital data, which is applied to a decoder 16. In the decoder 16, the digital data is decoded into data in the two-dimensional coordinates. The data thus decoded is stored in a memory 17 temporarily. The data read from the memory 17 is converted into an analog video signal, which is applied to a composing circuit 13. In response to the output signal of the circuit 13, a drive circuit 14 causes a display 15, which is preferably a CRT (cathode-ray tube) to display the map data.

In a comparator circuit 11, the output of the processor 5 is compared with that of the memory 17. The comparison result is applied to a correcting circuit 12. When the present positioned detected by the processor 5 does not coincide with a predetermined one of the data outputted by the memory means 17, the correcting circuit 12 operates to correct the present position to the data closest thereto. For instance, in the case where the present position detected by the processor 5 is off the road on the map, the present position is corrected so that it is located on the nearest road. The signal (vehicle mark) representing the present position thus corrected is applied to the composing circuit 13 where it is combined with the map data provided by the memory 17, the output of the composing circuit 13 is displayed by the display 15 with the aid of the drive circuit 14.

When the present position changes, the processor 5 obtains the travel locus form the old present position and the new present position. The travel locus thus obtained is displayed on the display 15, similar to the case of the present position.

The operator of the vehicle can obtain the vehicle's present position on the map displayed by viewing the display 15 to thus drive the vehicle to the desired destination.

In the conventional navigation apparatus where map data is recorded in a digital mode on a disk in the above-described manner, the picture displayed on the display is insufficient in resolution, color tone and number of colors, and hence it is rather difficult to view. The map displayed on the display 15 appears completely different in pattern from those to which the operator is accustomed (i.e., a map printed on paper). Therefore, it is often impossible for the operator to locate the present position quickly on the map, and at worst he may locate his vehicle in error. The resolution can of course be increased; however, a straightforward increase of the resolution suffer from the difficulty that the amount of data which must be stored is increased, and therefore the access time is increased and the capacity of the memory must be increased, making the navigation system is unavoidably high in manufacturing cost.

For instance, in the case where, similar to the NTSC television system, the display has 525 scanning lines, and each scanning line is composed of 400 dots, eight colors (3 bits) are employed, and eight tones (3 bits) are used, the data requirement for one picture is:

$$525 \times 400 \times 3 \times \tfrac{1}{8} \cong 236 \text{ K bytes}$$

That is, one picture is made up of about 240 K bytes of data, the effective data transfer rate of a CD-ROM is not more than about 130 K bytes. Therefore, it takes at least two or three seconds to read the data for one picture (one map). Also, the number of maps which can be recorded on one disk is limited to about two hundred at the maximum.

SUMMARY OF THE INVENTION

Accordingly, an object of the present invention is to record a number of pieces of map data and to reproduce such data in a manner whereby the displayed maps can be read with ease.

In accordance with the invention, a video FM signal of a first frequency band obtained by frequency-modulating a video signal of map data, and a video digital signal of a second frequency band obtained by digitizing and digitally modulating a video signal of a travel path of the map data along which an object to be guided moves are recorded on a disk in a frequency division multiplex mode in such a manner that the video digital signal of the travel path in a picture is in the same track as the video FM signal of N fields (N being an integer) of the corresponding picture.

The video signal of the map data is converted into the video FM signal of the first frequency band with a predetermined carrier subjected to frequency modulation. The video signal of the travel path of the map data along which the object to be guided moves is digitized and digitally modulated into a video digital signal of the second frequency band different form the first frequency band. The video FM signal and the video digital signal are recorded on the disk in a frequency division multiplex mode. The video digital signal of the travel path in one picture (for instance, two fields) is arranged on the same track as the video FM signals of N fields (N being an integer such as 2 or 3) of the corresponding picture.

More specifically, a navigation apparatus, according to the invention, comprises reproducing means for reproducing a recording medium on which a video FM signal of a first frequency band obtained by frequency-modulating a video signal of a travel path of the map data, and a video digital signal of a second frequency band obtained by digitizing and digitally modulating a video signal of a travel path of the map data along which an object to be guided moves are recorded in a frequency division multiplex mode; a first demodulating circuit for demodulating the video FM signal from the output of the reproducing means; a second demodulating circuit for demodulating the video digital signal from the output of the reproducing means; a processor for obtaining a signal representing the present position of the object; a comparison circuit for comparing the output of the processor with the output of the second demodulating circuit; a composing circuit for combining the output of the first demodulation circuit with the present position of the object; and display means for displaying the output of the composing means.

The video signal of the map data is converted into the video FM signal of the first frequency band with the predetermined carrier subjected to frequency modulation. The video signal of the travel path of the map data along which the object to be guided moves is digitized and digitally modulated into the video digital signal of the second frequency band different from the first frequency band. The video FM signal and the video digital signal are recorded on the recording medium in the frequency division multiplex mode. The reproducing means reproduces the recording medium. The first demodulating circuit demodulates the video FM signal from the output of the reproducing means, while the second demodulating circuit demodulates the video digital signal from the output of the reproducing means, the processor operates upon the present position of the object to be guided. The comparison circuit compares the present position thus operated upon with the output of the second demodulating circuit to detect the difference therebetween. The output of the first demodulating circuit is combined with the present position by the composing circuit, the output of which is displayed on the display means.

DESCRIPTION OF THE PREFERRED EMBODIMENTS

Figure 2:
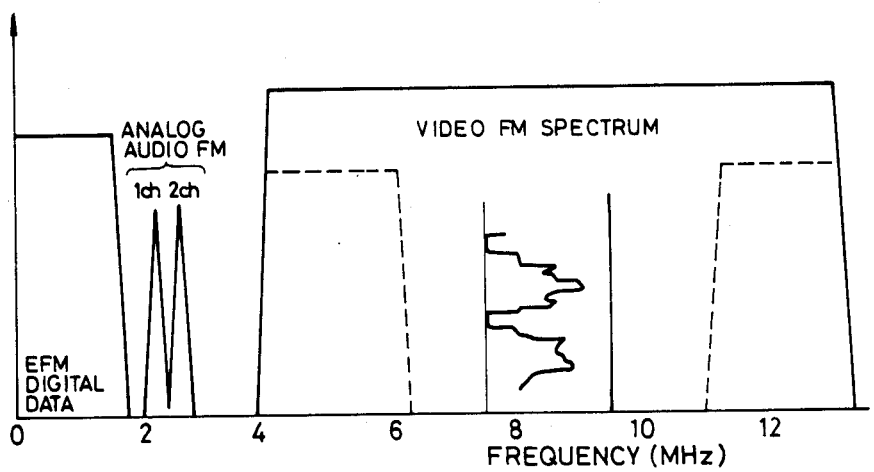
FIG. 2 is a spectrum diagram of a disk for the navigation apparatus.

FIG. 2 is a spectrum diagram showing signals which are recorded on a disk (optical video disk) used in a navigation apparatus constructed according to the invention. A map data video signal having, for instance, a frequency range of 4.2 MHz at baseband is converted into a video FM signal by frequency-modulating a predetermined carrier. The video signal (luminance signal) frequency shifts the carrier to the extent that the peak sync level is at 7.6 MHz and the white peak level is at 9.3 MHz. As a result, the lower limit frequency of the lower primary sideband of the video FM signal is about 3.9 MHz, and the upper limit frequency of the upper primary sideband is about 13.5 MHz.

On the other hand, the video signal of a travel path such as a road (one form of map data) along which a vehicle is to be guided is separated from the other signals and digitized. The signal thus digitized is subjected to digital modulation, such as EFM modulation, so as to be converted into a video digital signal, the frequency band width of the video digital signal extends up to about 1.75 MHz.

Two-channel audio FM signals are produced by frequency-modulating carriers of 2.3 MHz and 2.8 MHz.

The above-described video FM signal, video digital signal and audio FM signals are recorded on the disk in a frequency division multiplex mode.

Figure 3A:
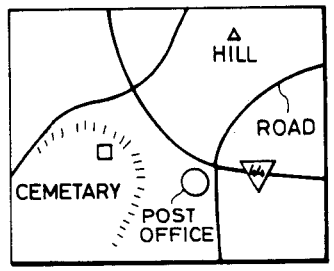
FIGS. 3A and 3B are an explanatory diagram used for a description of a display produced by the inventive apparatus.
Figure 3B:
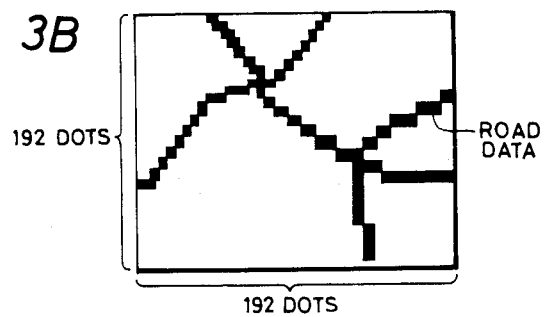

In the NTSC system, each picture is formed by video signals of one frame composed of two fields. Therefore, one map is formed by video signals of one frame, for instance, as shown in FIG. 3A. The data on the travel paths in one frame (one map) as shown in FIG. 3B are arranged in the corresponding video FM signal frame on the same track.

Assuming that digital data can be transferred at a rate of 150 K bytes/s, the amount of digital data which can be included in one frame(30 Hz) is about 5 K bytes. Where, as shown in FIG. 3B, the travel paths are displayed with a resolution of 192×192 dots with the travel paths as "1" and with other regions as "O", the amount of data required is about 4.6 K bytes. Therefore, the road data (digital data) for one map can be arranged in one frame. If the available digital data storing capacity is not sufficient, video signals for N frames (2N fields) can be regarded as those for one map and the digital data of the travel paths in one map (one frame) are recorded in the N frames. For instance, two frames can be used for one map (one frame) and the data of the travel paths in the map recorded in the two frames. In this case, the digital data storing capacity is 9.2 K bytes for the N frames.

It goes without saying that, instead of a video disk, a compact disk (CD) can be employed as the map data recording medium. The compact disk is generally used in a CLV (constant linear velocity) mode; however, if it is used in a CAV (constant angular velocity) mode, because its outer tracks have a high spatial frequency capacity, a CLV disk can record motion pictures for a period of about five minutes, and accordingly about 9000 maps (=5×60×30) can be stored. It should be noted that no video FM signals are recorded on the compact disk.

Figure 1:
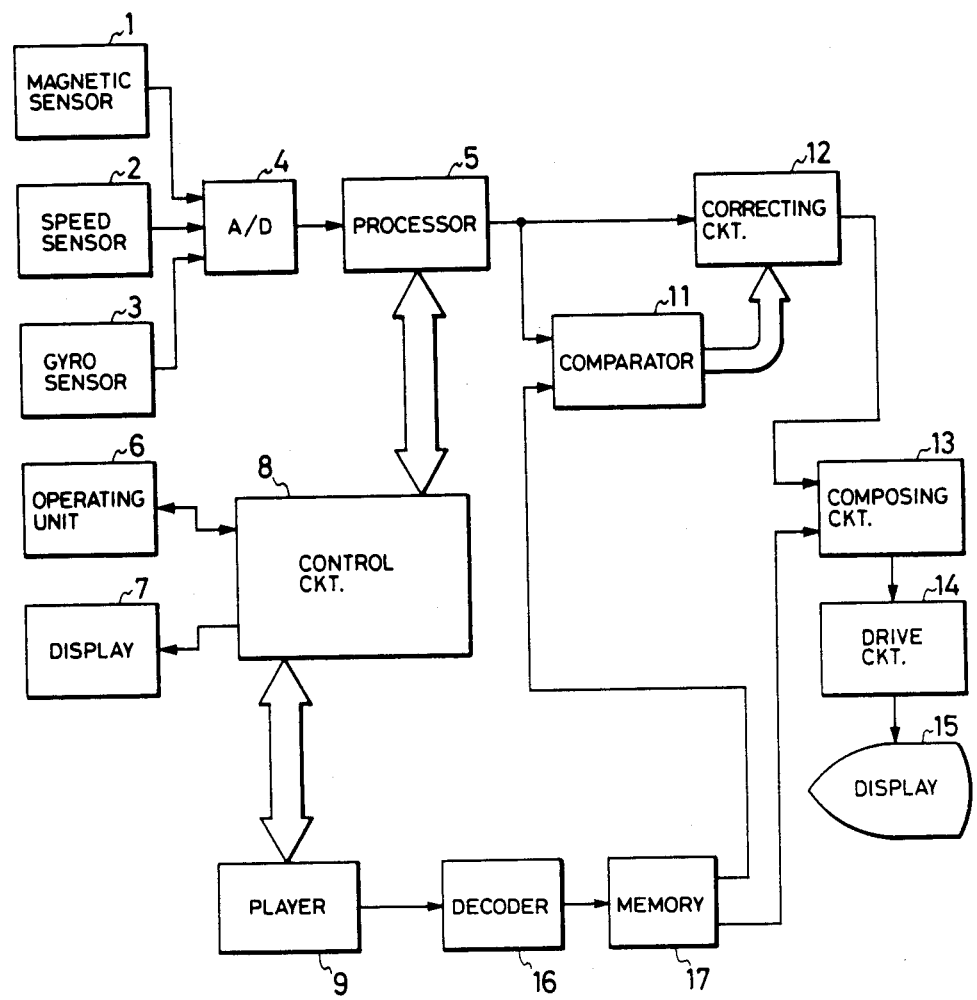
FIG. 1 is a block diagram showing a conventional navigation apparatus.
Figure 4:
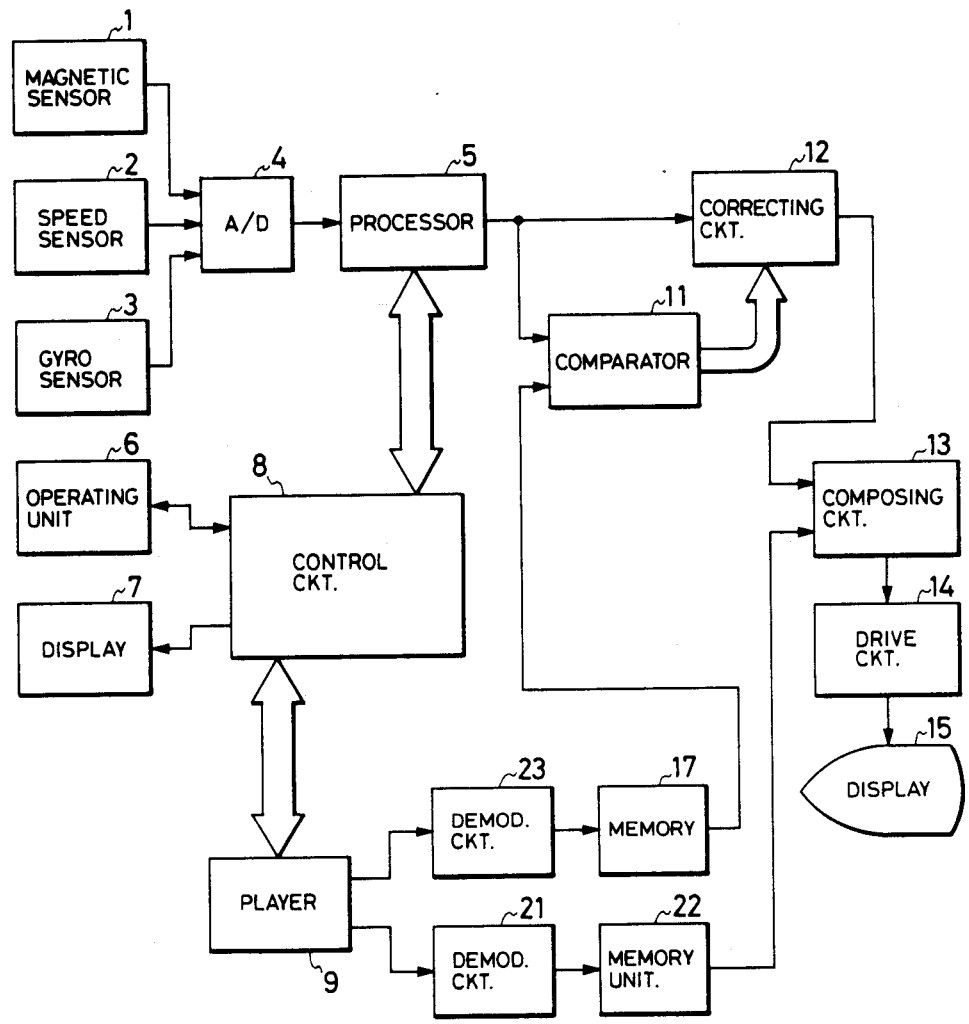
FIGS. 4 and 5 are block diagrams showing a navigation apparatus constructed according to the invention.

FIG. 4 is a block diagram showing a navigation apparatus constructed according to the invention. In FIG. 4, those components which have been previously described with reference to FIG. 1 are designated by the same reference numerals.

In the navigation apparatus of FIG. 4, a demodulation circuit 23 separates the video digital signal from the output of the player 9 and demodulates it. Similarly, another demodulation circuit 21 separates the video FM signal and demodulates it. The output of the demodulation circuit 21 is applied to the composing circuit 13 through a memory unit 22 added when necessary.

Figure 5:
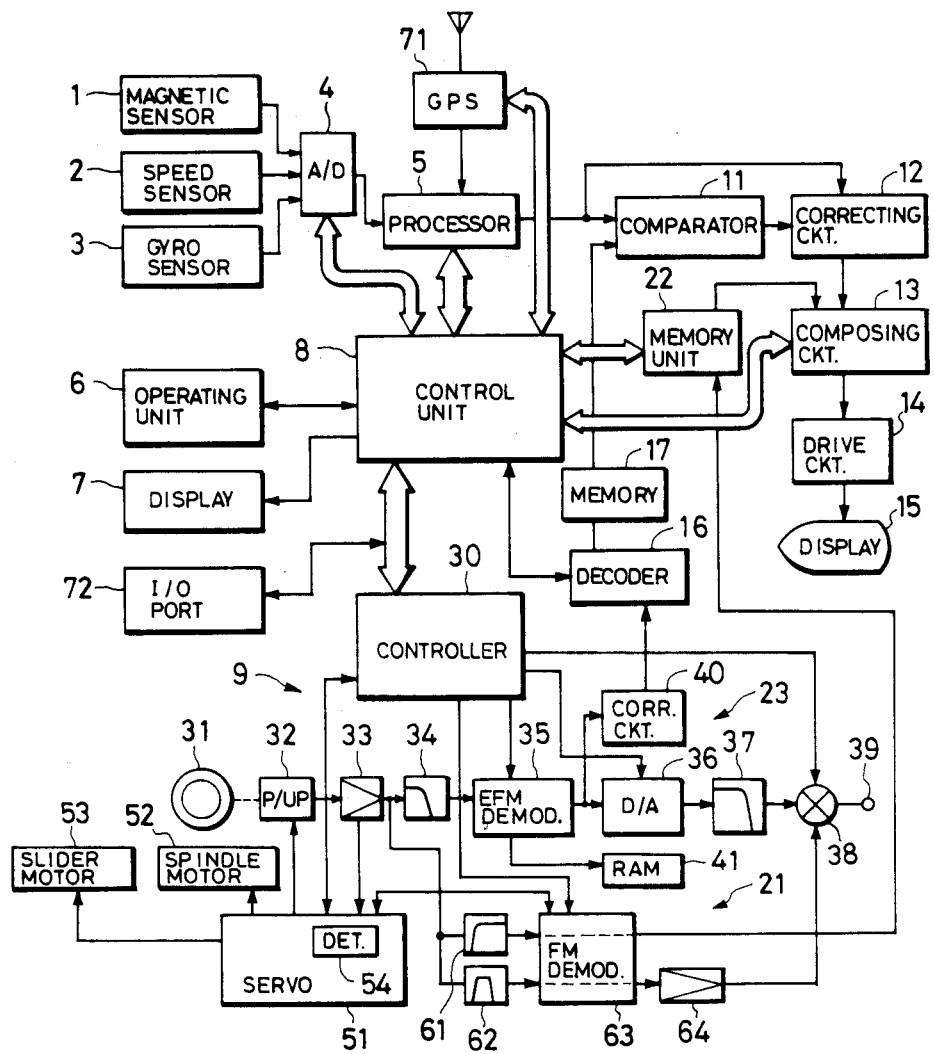

FIG. 5 is a block diagram showing the navigation apparatus in more detail. In FIGS. 4 and 5, like parts are designated by like reference numerals or characters. In FIG. 5, reference numeral 30 designates a controllers, inclusive of a microcomputer, in the player 9. The controller 30 controls a spindle motor 52 through a servo circuit 51 to rotate a disk 31, and controls a slider motor 53 to move a pickup 32 radially of the disk. The servo circuit 51 controls the pickup 32 so that the pickup 32 is operated by the focus servo, tracking servo or fine time axis servo.

The pickup 32 outputs an RF signal, which is amplified by an amplifier circuit 33. The RF signal is applied to a low-pass filter 34, where a video digital signal lower than 1.75 MHz in frequency is separated from the output. The video digital signal is applied to a demodulation circuit 35 where it is subjected to EFM demodulation and to CIRC correction. A table necessary for these operations is stored in a RAM 41. The digital signal thus demodulated is applied to a correction circuit 40 where it is subjected to error correction. The output of the circuit 40 is applied to the decoder 16 where it is decoded.

The data on travel paths of one frame which have been converted into two-dimensional coordinates by the decoder 16 are stored in the memory 17.

Similar to the above-described case, in the comparison circuit 11 the data thus stored is compared with the present position data outputted by the processor 5, and according to the result of comparison, the correction circuit is controlled so that the present position is corrected.

On the other hand, the output RF signal of the amplifier circuit 33 is applied to a high-pass filter 61 where a video FM signal higher than 3.5 MHz is separated from the output RF signal. The video FM signal thus separated is applied to a demodulation circuit 63 where it is subjected to FM demodulation to produce an analog video signal. The analog video signal is applied to the memory unit 22 which includes for instance a frame memory. The memory unit 22, which includes a circuit for subjecting the analog video signal to A/D conversion, stores map data corresponding to one frame. The data stored in the memory unit 22 is read out and subjected to D/A conversion and applied to the composing circuit 13.

In the case where a CLV disk is employed, it is necessary to provide the memory unit 22. However, in the case where a CAV disk is used, it is not always necessary to use the memory unit 22. In the latter case, the pickup 32 can be made to repeatedly trace one track to produce a so-called "still picture". Therefore, the same map data can be repeatedly supplied to the composing circuit 13 without using the memory unit 22.

Similar to the above-described case, the composing circuit 13 combines the present position and the locus to the present position outputted by the correcting circuit 12 and the map data outputted by the memory unit 22. The output of the composing circuit 13 is displayed on the display 15 with the aid of the drive circuit 14. In this case, the map data as shown in FIG. 3A can be clearly read because it is obtained by conversion an ordinary map (printed on paper or the like) into analog video signals, and the video digital signals as shown in FIG. 3B correspond completely to the map because they have been obtained by digitizing the travel paths on the map. The present position, being included in the digital data by the correcting circuit 12, is displayed in such a manner that it is located on the correct corresponding one of the travel paths.

As the vehicle moves, the present position changes on the map. When the present position reaches the periphery of the map, the control circuit 8 controls the controller 30 so that the next map is searched. The same operations are carried out for the new map.

The various positions of each map are recorded as digital data (or TOC data) in a predetermined track of the disk. The data are read and stored by the control circuit immediately after the start of the navigation operation. Accordingly, when necessary, by specifying a predetermined address (frame number), a predetermined map can be searched.

If the addresses of the maps are recorded together with the operating program as described above, the same navigation apparatus can be applied to an entire set of disks prepared for zones or areas such as various metropolitan areas or countries.

In FIG. 5, reference numeral 71 designates a PSG unit which receives signals from satellite to detect the present position of the vehicle. If necessary, the processor 5 selects the one of the outputs of the GPS unit and the sensors 1 through 3 smallest in error.

Further in FIG. 5, reference numeral 72 designates an input/output (I/O) port used to transmit data between the navigation apparatus and external equipment.

Reference numeral 54 designates a detecting circuit which detects a disk identifying signal, for instance, from the TOC data in the innermost periphery of the disk, and applies these data to the controller 30. In the case where a navigation disk is detected, the controller 30 permits the above-described navigation operation. When an ordinary audio compact disk is detected, the controller 30 activates the D/A converter circuit 36. On the audio compact disk, audio signals are recorded. The digital audio signals outputted by the demodulation circuit 35 are converted into analog signals by the D/A converter circuit 36. The analog signals are applied through a low-pass filter 37 and a switch 38 to an output terminal 39 connected to a loudspeaker or the like (not shown).

When an ordinary video disk is loaded, the demodulation circuit 63 outputs an analog video signal, which is applied through the memory unit 22, the composing circuit 13 and the driver 14 to the display 15. In this operation, the output of the amplifier circuit 33 is applied to a bandpass filter 62, which has a passband of from 2.3 MHz to 2.8 MHz, where an audio FM signal is separated out. The audio FM signal is subjected to frequency demodulation by the demodulation circuit 63 and amplified by the amplifier circuit 64. The output of the amplifier circuit 64 is applied to the switch 38. In response to an input signal from the operating unit 6, the switch 38 selects one of the outputs of the low-pass filter 37 (digital audio signal) and the amplifier circuit 64 (FM audio signal) and applies it to the output terminal 39. The operator can select a desired one of the audio signals.

Audio FM signals can be recorded on a navigation disk. However, when map data are displayed, the same track is repeatedly traced, and therefore sound can be reproduced for only about 1/30 second, which makes it impractical to employ a sound signal in such a case.

Accordingly, no audio FM signal demodulation is carried out. It goes without saying that in the case where different tracks are successively traced, audio FM signal demodulation may be carried out.

The invention has been described with reference to the case where the object to be guided is a vehicle traveling on the ground; however, it can be applied to navigation apparatuses on airplanes and ships.

Airplanes and ships often leave their designated courses. Therefore, in an airplane or ship navigation apparatus, correction of the present position is not carried out, and instead the designated course is employed as the travel path. The map (including an air navigation chart and a sea navigation chart), the travel path and the present position are displayed in combination. When the deviation of the present position from the travel path is larger than a predetermined value, as detected in the comparator circuit 11, then, for instance, the present position can be indicated by a flashing marks to warn the operator of the deviation.

As described above, in accordance with the invention, the video FM signal of the first frequency band obtained by frequency-modulating the video signal map data, and the video digital signal of the second frequency band which is obtained by digitizing and digitally modulating the video signal of a travel path along which the object to be guided moves are recorded in a frequency division multiplex mode so that the video digital signal of travel paths in one picture is on the same track as the video FM signals of N fields of the corresponding picture (N being an integer). As a result, the present position corresponding correctly to the travel path can be indicated on a number of maps which can be read with ease.

We claim:

1. In a disk containing map data and the like for use with a navigation apparatus, the improvement wherein a video FM signal of a first frequency band obtained by frequency-modulating a video signal containing map data, and a video digital signal of a second frequency band obtained by digitalizing and digitally modulating a video signal indicative of a travel path of said map data along which an object to be guided moves are recorded in a frequency division multiplex mode in such a manner that said video digital signal of said travel path in a picture is on the same track as said video FM signals of N fields, N being an integer, of the corresponding picture.

2. A navigation apparatus comprising:
   reproducing means for reproducing a recording medium on which a video FM signal of a first frequency band obtained by frequency-modulating a video signal containing map data and a video digital signal of a second frequency band obtained by digitizing and digitally modulating a video signal indicative of a travel path of said map data along which an object to be guided moves are recorded in a frequency division multiplex mode;
   a first demodulating circuit for demodulating said video FM signal from an output of said reproducing means;
   a second demodulating circuit for demodulating said video digital signal from said output of said reproducing means;
   means for obtaining a signal representing a present position of said object;
   a comparison circuit for comparing an output of said processor with an output of said second demodulating circuit;
   a composing circuit for combining an output of said first demodulating circuit with said signal representing the present position of said object; and
   display means for producing a map display in response to an output of said composing means.

3. The navigation apparatus of claim 2, wherein said map data are obtained by converting a printed map to the form of a digital signal.

* * * * *